United States Patent
Yoshida

(10) Patent No.: US 11,628,575 B2
(45) Date of Patent: Apr. 18, 2023

(54) ROBOT CONTROLLER AND ARC WELDING ROBOT SYSTEM

(71) Applicant: FANUC CORPORATION, Yamanashi (JP)

(72) Inventor: Shigeo Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 16/994,913

(22) Filed: Aug. 17, 2020

(65) Prior Publication Data

US 2021/0060792 A1 Mar. 4, 2021

(30) Foreign Application Priority Data

Aug. 30, 2019 (JP) .............................. JP2019157802

(51) Int. Cl.
*B23K 9/12* (2006.01)
*B25J 9/16* (2006.01)
*B25J 13/08* (2006.01)
*B25J 13/06* (2006.01)
*B23K 37/02* (2006.01)

(52) U.S. Cl.
CPC .............. *B25J 13/08* (2013.01); *B23K 9/126* (2013.01); *B23K 37/02* (2013.01); *B25J 9/1651* (2013.01); *B25J 9/1676* (2013.01); *B25J 13/06* (2013.01)

(58) Field of Classification Search
CPC ........ B25J 13/08; B25J 9/1651; B25J 9/1676; B25J 13/06; B23K 9/126; B23K 37/02; B23K 9/0953; B23K 9/0956; B23K 9/12; B23K 9/124; B23K 37/0211; B23K 9/173; B23K 9/125; B23K 9/28; B23K 9/32; B23K 9/1087; G05B 2219/45104; G05B 19/425
See application file for complete search history.

(56) References Cited

U.S. PATENT DOCUMENTS

| | | | | |
|---|---|---|---|---|
| 5,485,389 A | * | 1/1996 | Terada | ................... B25J 9/1656 |
| | | | | 700/255 |
| 2008/0142493 A1 | * | 6/2008 | Uecker | .................. B23K 9/125 |
| | | | | 219/137 R |
| 2016/0221105 A1 | * | 8/2016 | Henry | .................... B23K 9/173 |
| 2018/0304391 A1 | | 10/2018 | Kotera | |
| 2019/0039161 A1 | * | 2/2019 | One | ......................... B25J 19/00 |

FOREIGN PATENT DOCUMENTS

| | | |
|---|---|---|
| JP | S6149785 A | 3/1986 |
| JP | H062316 B2 * | 1/1994 |
| JP | 2014223633 A | 12/2014 |
| JP | 2018183830 A | 11/2018 |

* cited by examiner

*Primary Examiner* — Abby Y Lin
*Assistant Examiner* — Dylan M Katz
(74) *Attorney, Agent, or Firm* — Karceski IP Law, PLLC

(57) ABSTRACT

A robot controller includes a contact detection unit that detects contact of a welding wire protruding from a welding torch with a welding target, an override-value adjustment unit that sets and changes an override value for increasing or decreasing an operating speed of the robot from a predetermined speed, and a control unit which receives an operation signal from a teaching operation device and that controls the robot according to the operation signal at the operating speed based on the override value which is set by the override-value adjustment unit. When the contact of the welding wire with the welding target is detected by the contact detection unit, the control unit temporarily stops the robot, and the override-value adjustment unit decreases the override value.

7 Claims, 4 Drawing Sheets

ROBOT CONTROLLER AND ARC WELDING ROBOT SYSTEM

CROSS-REFERENCE TO RELATED APPLICATIONS

This application is based on and claims priority to Japanese Patent Application No. 2019-157802, filed on Aug. 30, 2019, the entire content of which is incorporated herein by reference.

FIELD OF THE INVENTION

The present invention relates to a robot controller and an arc welding robot system.

BACKGROUND OF THE INVENTION

At the time of welding using an arc welding robot, a welding torch is made to approach a welding target, and a distal end of a welding wire protruding from the welding torch is moved along welding parts. In order to teach this operation, it is necessary to move the arc welding robot to a welding start point and a welding end point. At this time, if the welding wire is unintentionally brought into contact with the welding target, a force in the direction toward the welding target is applied from the welding torch to the welding wire, and the welding wire might be bent. Thus, a robot control method for preventing bending of a welding wire due to contact with a welding target has been proposed (for example, see Japanese Unexamined Patent Application, Publication No. 2014-223633 and Japanese Unexamined Patent Application, Publication No. 2018-183830).

SUMMARY OF THE INVENTION

According to an aspect, the present disclosure provides a robot controller that controls motion of a robot, to which a welding torch is connected, during a jog operation of the robot using a teaching operation device, the robot controller including: a contact detection unit that detects contact of a welding wire protruding from the welding torch with a welding target; an override-value adjustment unit that sets and changes an override value for increasing or decreasing an operating speed of the robot from a predetermined speed; and a control unit that receives an operation signal from the teaching operation device and that controls the robot according to the operation signal at the operating speed based on the override value, the override value being set by the override-value adjustment unit, wherein the control unit temporarily stops the robot and the override-value adjustment unit decreases the override value when the contact of the welding wire with the welding target is detected by the contact detection unit.

DESCRIPTION OF EMBODIMENT(S) OF THE INVENTION

A robot controller 1 and an arc welding robot system 2 according to an embodiment will be described below with reference to the drawings.

Figure 1:
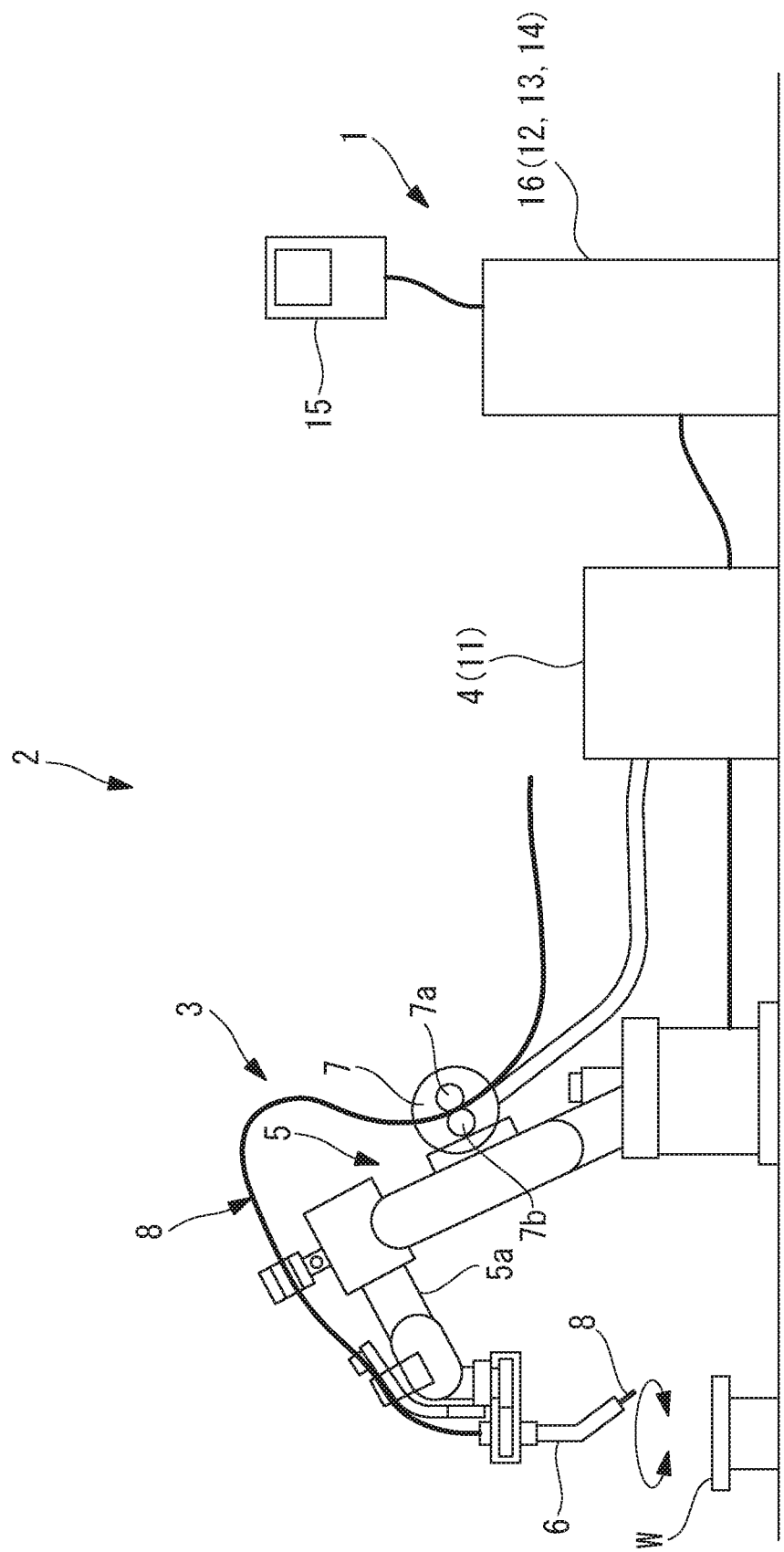
FIG. 1 is a view showing the overall configuration of an arc welding robot system according to one embodiment.

As shown in FIG. 1, the arc welding robot system 2 includes an arc welding robot 3, a welding power supply 4, and a robot controller 1 that controls the arc welding robot 3 and the welding power supply 4.

The arc welding robot 3 includes a robot 5, a welding torch 6 that is connected to the robot 5, and a wire feeding device 7 that feeds a welding wire 8 to the welding torch 6.

The robot 5 is a robot of any kind that is generally used for arc welding, and is, for example, a 6-axis vertical articulated robot. The robot 5 has an articulated robot arm 5a and servomotors (not shown) for joints. The welding torch 6 is connected to a distal end of the robot arm 5a. The robot 5 is connected to the robot controller 1, and the robot controller 1 drives the servomotors, thereby operating the robot arm 5a and changing the position and the orientation of the welding torch 6 three-dimensionally.

The wire feeding device 7 is provided on the robot arm 5a. The wire feeding device 7 feeds the welding wire 8 toward the welding torch 6 through rotation of a pair of rollers 7a and 7b. The welding wire 8 protrudes from a distal end of the welding torch 6.

The welding power supply 4 is connected to the welding torch 6. The welding power supply 4 applies a welding voltage or a weak voltage to the welding wire 8 via the welding torch 6. The welding voltage is a voltage for generating an arc discharge between the welding wire 8 and a welding target W. The weak voltage is a voltage for detecting contact of the welding wire 8 with the welding target W. The magnitude of the weak voltage is less than that of the welding voltage and is set so as not to generate an arc discharge even when the welding wire 8 is brought into contact with the welding target W.

Figure 2:
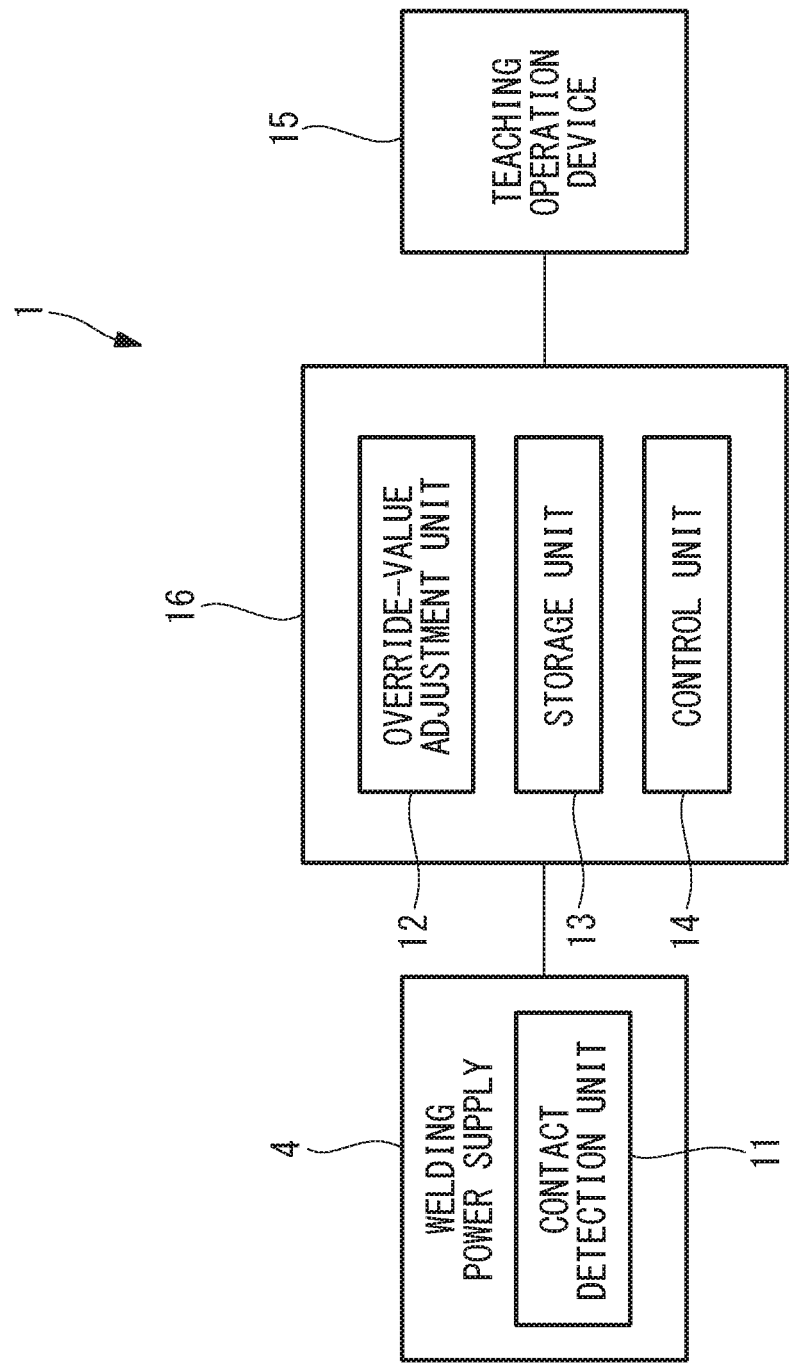
FIG. 2 is a block diagram showing the configuration of a robot controller according to the embodiment.

As shown in FIG. 2, the robot controller 1 includes a contact detection unit 11, an override-value adjustment unit 12, a storage unit 13, and a control unit 14. Furthermore, the robot controller 1 includes a teaching operation device 15 that allows an operator to manually operate the robot 5. The operator can perform jog operations to manually operate the robot 5 at a low operating speed by using the teaching operation device 15. The contact detection unit 11 is provided in the welding power supply 4, and the override-value adjustment unit 12, the storage unit 13, and the control unit 14 are provided in a control box 16. The teaching operation device 15 is, for example, a portable teach pendant carried by the operator and is connected to the control unit 14 in the control box 16 by wires or wirelessly.

The contact detection unit 11 detects contact of the welding wire 8 with the welding target W during the jog operation of the robot 5 performed by using the teaching operation device 15. Specifically, during the jog operation of the robot 5, the control unit 14 controls the welding power supply 4 to apply the weak voltage to the welding wire 8 from the welding power supply 4. The voltage between the welding wire 8 and the welding target W drops due to contact of the welding wire 8 with the welding target W. The contact detection unit 11 measures the voltage between the welding wire 8 and the welding target W during the jog operation of the robot 5 and detects a drop of the voltage as contact of the welding wire 8 with the welding target W. The contact detection unit 11 includes, for example, a circuit that is connected to the welding wire 8 and the welding target W and that measures the voltage between the welding wire 8 and the welding target W. The contact detection unit 11 is connected to the override-value adjustment unit 12 in the control box 16 and sends a detection result to the override-value adjustment unit 12.

The override-value adjustment unit 12 sets, when in a teaching mode, an override value for increasing or decreasing the operating speed of the robot 5 from a predetermined speed. The teaching mode is a mode in which the control unit 14 controls the robot 5 according to an operation signal that is based on an operation of the teaching operation device 15 performed by the operator. The operating speed of the robot 5 is decreased as the override value becomes smaller. For example, the predetermined speed is the maximum operating speed of the robot 5 in the teaching mode, the maximum operating speed being set in advance, and the override value is a value selected from the range from 0% exclusive to 100% inclusive. In one example case, when the override value is set to 50%, the robot 5 is controlled by the control unit 14 at half of the maximum operating speed.

The teaching operation device 15 includes a setting unit for allowing the operator to set the override value. A set value for the override value set by the operator is sent from the teaching operation device 15 to the override-value adjustment unit 12 via the control unit 14, and the override-value adjustment unit 12 sets the set value in the override value. The operator sets and changes the override value through an operation of the setting unit, thereby making it possible to set and change the operating speed of the robot 5 to an arbitrary speed.

Furthermore, during the teaching mode, when contact of the welding wire 8 with the welding target W is detected by the contact detection unit 11, the override-value adjustment unit 12 changes the override value from the set value to a low value that is smaller than the set value. Then, after the contact is detected by the contact detection unit 11, when the welding wire 8 is moved by a predetermined distance D in a direction that is parallel to the direction in which the welding wire 8 protrudes from the welding torch 6 and that is away from the welding target W, the override-value adjustment unit 12 increases the override value from the low value to the set value. Whether the welding wire 8 is moved by the predetermined distance D is determined on the basis of, for example, a change in the position of the distal end of the robot arm 5a calculated by the control unit 14.

The above-described function of the override-value adjustment unit 12 is realized, for example, when a processor included in the override-value adjustment unit 12 executes processing according to an override-value adjustment program stored in the storage unit 13.

The storage unit 13 has a RAM, a ROM, and another arbitrary storage device. The storage unit 13 stores a control program.

The control unit 14 has a processor. A function of the control unit 14, to be described later, is realized when the processor executes processing according to the control program.

In the teaching mode, the control unit 14 receives an operation signal from the teaching operation device 15 and sends control commands to the respective servomotors of the robot 5 according to the operation signal, thereby operating the robot arm 5a.

Furthermore, in the teaching mode, the control unit 14 determines the operating speed of the robot 5 on the basis of the override value set by the override-value adjustment unit 12 and controls the robot 5 at the determined operating speed. As described above, the operating speed of the robot 5 is determined so as to be slower as the override value becomes smaller. For example, when the override value is a value selected from the range from 0% exclusive to 100% inclusive, the operating speed of the robot 5 is determined to be the product of the predetermined speed and the override value.

Furthermore, in the teaching mode, when contact of the welding wire 8 with the welding target W is detected by the contact detection unit 11, the control unit 14 stops the operation of the robot 5 irrespective of whether an operation signal has been received from the teaching operation device 15.

The teaching operation device 15 includes an operated member, e.g., a jog button, operated by the operator. The operation of the operated member can be associated with the movement of the welding torch 6 in a tool coordinate system fixed to the welding torch 6. The teaching operation device 15 sends, to the control unit 14, an operation signal corresponding to the operation of the operated member, and the control unit 14 operates the robot 5 according to the operation signal. Therefore, in the teaching mode, the operator can perform the jog operation of the robot 5 by using the operated member and can operate the robot 5 at a low speed.

Next, the operation of the arc welding robot system 2 will be described below.

In the teaching mode, when the jog operation of the robot 5 using the teaching operation device 15 is started, the control unit 14 controls the welding power supply 4 and starts to apply the weak voltage to the welding wire 8. Accordingly, contact of the welding wire 8 with the welding target W can be detected by the contact detection unit 11. At this time, the override value is set by the override-value adjustment unit 12 to the set value, which is set by the operator. The control unit 14 controls the robot 5 at the set speed determined from the set value.

Figure 3:
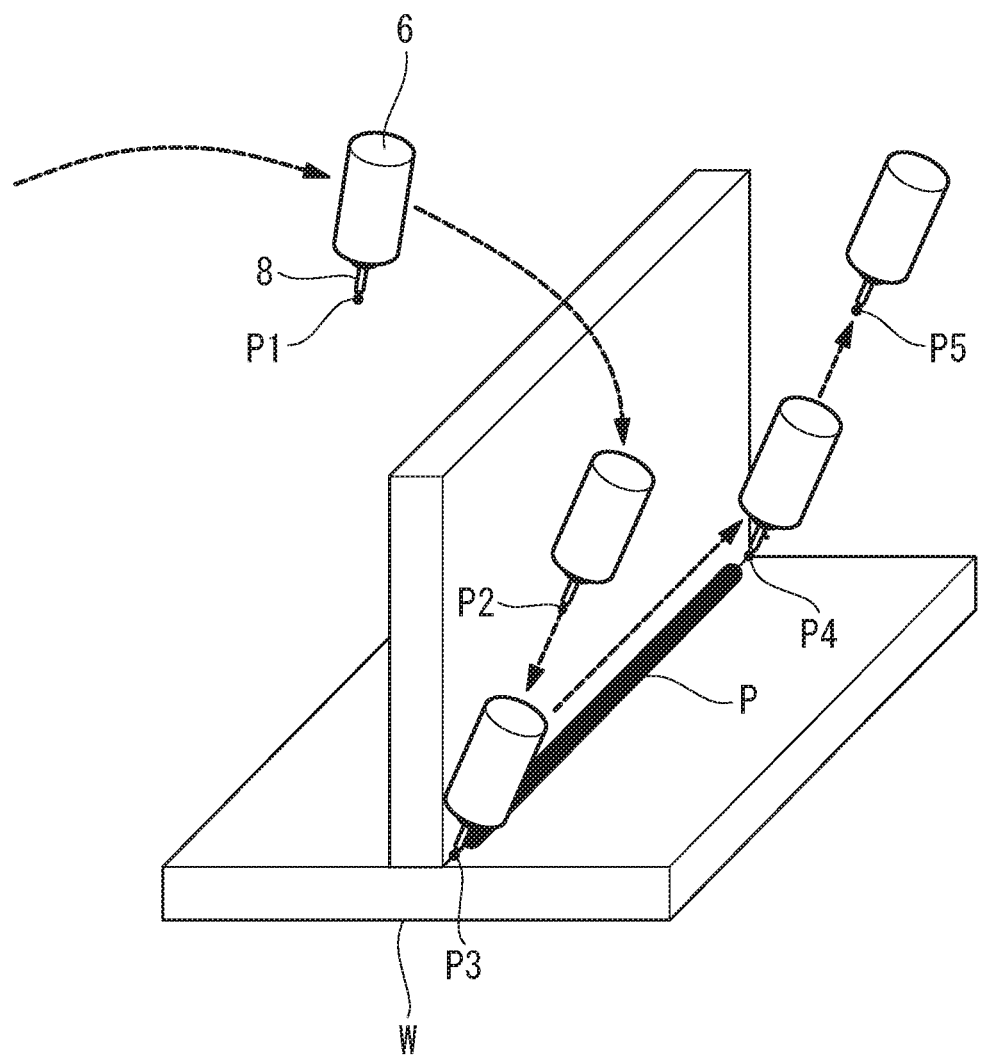
FIG. 3 is a view for explaining a movement path taught to a robot.

The operator teaches the robot 5 a plurality of teaching points on a movement path by using the teaching operation device 15. For example, as shown in FIG. 3, the movement path includes, as the teaching points, an air cut point P1, an approach point P2 for the welding target W, a welding start point P3, a welding end point P4, and an escape point P5. The welding start point P3 and the welding end point P4 are located on the surface of the welding target W.

The operator performs the jog operation of the robot 5 by using the teaching operation device 15 and positions a distal end of the welding wire 8, which protrudes from the welding torch 6 by a predetermined length, at the air cut point P1. Next, the operator presses a memory button (not shown) that is provided on the teaching operation device 15, for example, to make the storage unit 13 store the position and the posture of the robot arm 5a obtained when the distal end of the welding wire 8 is positioned at the air cut point P1. Accordingly, the air cut point P1 is taught to the robot controller 1.

Next, the operator performs the jog operation of the robot 5 by using the teaching operation device 15 to move the distal end of the welding wire 8 from the air cut point P1 to the approach point P2 and positions the distal end of the welding wire 8 at the approach point P2. Then, the operator teaches the approach point P2 to the robot controller 1 by the same procedure as for the air cut point P1.

In the same way, the operator sequentially teaches the welding start point P3, the welding end point P4, and the escape point P5 to the robot controller 1.

Figure 4:
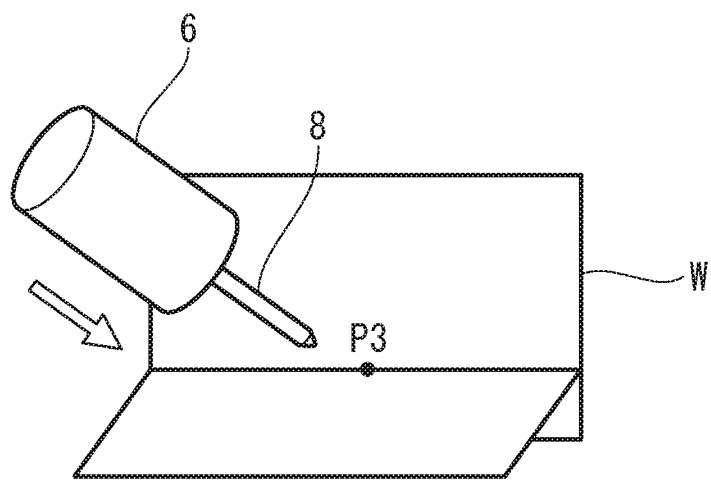
FIG. 4 is a view for explaining an approaching operation of a welding torch toward a welding target in a teaching mode.

Here, as shown in FIG. 4, when the distal end of the welding wire 8 being moved from the approach point P2 to the welding start point P3 comes into contact with the welding start point P3, the contact of the welding wire 8 with the welding target W is detected by the contact detection unit 11. In response to the detection of the contact, the control unit 14 temporarily stops the operation of the robot 5. Furthermore, in response to the detection of the contact, the control unit 14 stops applying the weak voltage from the welding power supply 4 to the welding wire 8, thereby cancelling the contact detection performed by the contact detection unit 11. Furthermore, in response to the detection of the contact, the override-value adjustment unit 12 decreases the override value from the set value to the low value.

The temporary stop of the robot 5 is released, for example, through a predetermined operation of the teaching operation device 15 performed by the operator. The operator performs the jog operation again on the robot 5 by using the teaching operation device 15, to move the distal end of the welding wire 8 from the welding start point P3 to the welding end point P4 along a welding path P on the surface of the welding target W. Because the override value is decreased to the low value when the distal end of the welding wire 8 comes into contact with the welding start point P3, the robot 5 is operated from the welding start point P3 to the welding end point P4 at a lower operating speed than the set speed.

Figure 5:
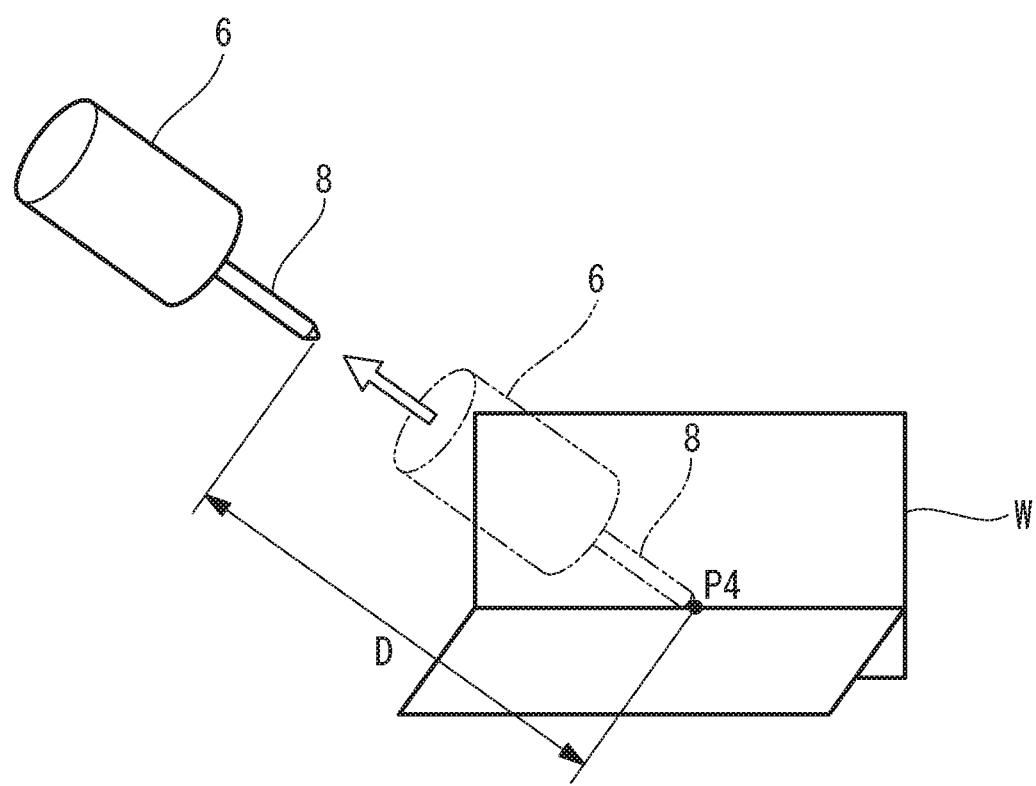
FIG. 5 is a view for explaining a separating operation of the welding torch from the welding target in the teaching mode.

After the welding end point P4 is taught, as shown in FIG. 5, when the welding wire 8 is moved from the welding end point P4 toward the escape point P5 by the predetermined distance D in the direction away from the welding target W, the override value that has been decreased is returned to the set value by the override-value adjustment unit 12. Therefore, after the distal end of the welding wire 8 is moved away from the welding target W by the predetermined distance D, the robot 5 is operated at the set speed.

If the robot 5 is kept operating after the contact of the welding wire 8, the welding torch 6 would further approach the welding target W with the welding wire 8 being in contact with the welding target W, and the welding wire 8 might be bent. According to this embodiment, when the welding wire 8 comes into contact with the welding target W, the robot 5 is automatically stopped. Accordingly, it is possible to prevent bending of the welding wire 8 due to contact with the welding target W.

Furthermore, according to this embodiment, the override value is automatically changed according to whether the robot 5 and the welding torch 6 are present in the vicinity of the welding target W. Specifically, the override value is automatically decreased when the welding wire 8 comes into contact with the welding target W. The contact of the welding wire 8 with the welding target W means that the robot 5 and the welding torch 6 are present in the vicinity of the welding target W. Then, after the override value is decreased, when the welding wire 8 is moved away from the welding target W by the predetermined distance D, the override value is automatically increased to the set value.

Through this change in the override value, it is possible to operate the robot 5 at a low speed in the vicinity of the welding target W and to operate the robot 5 at the set speed at a position away from the welding target W.

Furthermore, according to this embodiment, the above-described change in the override value is automatically performed on the basis of contact of the welding wire 8 with the welding target W and on the basis of a fact that the robot 5 is moved away from the welding target W by the predetermined distance D. Therefore, it is not necessary for the operator to perform a troublesome operation with the teaching operation device 15 for changing the override value.

In a case of a robot controller that does not include an automatic adjustment function for the override value, the operator manually decreases the override value through an operation of the teaching operation device 15 when the welding torch 6 approaches the welding target W, and then performs the jog operation of the robot 5. If the jog operation is performed without decreasing the override value, the robot 5 cannot be accurately operated, and, as a result, the welding wire 8 might be bent. In this case, the operator needs to perform recovery work in which the robot 5 is moved away from the welding target W through a jog operation, a certain amount of the welding wire 8 is fed by the wire feeding device 7, the bent section of the welding wire 8 is removed, the protruding section of the welding wire 8, which protrudes from the welding torch 6, is cut so as to have the predetermined length, and the distal end of the welding wire 8 is moved to the welding start point P3 again.

According to this embodiment, because the override value is automatically changed, the occurrence of such a troublesome recovery work can be prevented.

In the above-described embodiment, the control unit 14 may also prohibit the operation of the robot 5 in the direction toward the welding target W after contact is detected by the contact detection unit 11. For example, even when an operation signal for making the distal end of the robot arm 5a approach the welding target W is sent from the teaching operation device 15, the control unit 14 may also keep the position of the distal end of the robot arm 5a without accepting the operation signal.

According to this configuration, it is possible to prevent a situation in which the welding wire 8 is bent due to the movement of the welding torch 6 toward the welding target W in a state in which the distal end of the welding wire 8 is in contact with the welding target W.

In the above-described embodiment, after contact of the welding wire 8 with the welding target W is detected, when the robot 5 is moved away from the welding target W by the predetermined distance D, the override-value adjustment unit 12 may also change the override value from the low value to a value that is larger than the set value.

Furthermore, the override-value adjustment unit 12 may also increase the override value by the amount corresponding to the distance of the welding wire 8 from the welding target W. For example, the override-value adjustment unit 12 may also increase the override value in a continuous or stepwise manner as the distance of the welding wire 8 from the welding target W increases. Accordingly, the operating speed of the robot 5 is gradually increased as the distance from the welding target W increases.

In the above-described embodiment, when the override-value adjustment unit 12 increases the override value from the low value, the control unit 14 may also perform a notification operation for making the operator recognize that the override value has been increased. For example, the notification operation includes a temporary stop of the robot 5, vibration of the teaching operation device 15, the output of sound, lighting of a lamp, etc.

According to this configuration, on the basis of the notification operation of the control unit 14, the operator can recognize that the operating speed of the robot 5 will be then increased.

In the above-described embodiment, when the posture of the robot 5, for example, the posture of the distal end of the robot arm 5a, is changed by a predetermined angle or more, the control unit 14 may also prohibit the override-value adjustment unit 12 from changing the override value from the low value to the set value.

Since the orientation of the tool coordinate system with respect to the welding target W changes due to a change in the posture of the robot 5, it is difficult to accurately control the moving speed of the welding torch 6 in the direction toward the welding target W through an operation of the operated member of the teaching operation device 15. When the posture of the robot 5 is significantly changed, the override value is maintained at the low value, thereby making it possible for the operator to operate the robot 5 carefully at the low operating speed. Furthermore, the operator may also increase the override value from the low value to the set value, on the basis of his or her own judgment, through a manual operation of the teaching operation device 15.

In the above-described embodiment, when the coordinate system used for an operation of the operated member of the teaching operation device 15 is changed from the tool coordinate system to another coordinate system, the control unit 14 may also cancel a change of the override value from the low value to the set value performed by the override-value adjustment unit 12.

The arc welding robot 3 has, in addition to the tool coordinate system, coordinate systems, such as a robot coordinate system that is fixed to the base of the robot 5 and a wrist coordinate system that is fixed to the distal end of the robot arm 5a. If the coordinate system for an operation performed using the teaching operation device 15 is another coordinate system, it is difficult for the operator to accurately know the moving direction of the welding torch 6 through the jog operation using the teaching operation device 15. If the other coordinate system is used, the override value is maintained at the low value, thereby making it possible for the operator to operate the robot 5 carefully at the low operating speed.

The invention claimed is:

1. A robot controller that controls motion of a robot, to which a welding torch is connected, wherein the robot controller controls the motion of the robot during a jog operation of the robot in which an operator manually operates the robot to teach a moving route of the welding torch using a teaching operation device, the robot controller comprising:
   a contact detector that detects contact of a welding wire protruding from the welding torch with a welding target;
   an override-value adjuster that sets and changes an override value for increasing or decreasing an operating speed of the robot from a predetermined speed; and
   a processor that receives an operation signal for manual operation of the robot based on manual input to the teaching operation device by the operator and that controls the robot according to the operation signal at the operating speed based on the override value, the override value being set by the override-value adjuster,
   wherein, when contact of the welding wire with the welding target is detected, the processor temporarily stops the robot, and, when the contact of the welding wire with the welding target is detected by the contact detector, the override-value adjuster decreases the override value, and the processor makes the robot move in response to the operation signal based on the manual input by the operator with the override value decreased by the override-value adjuster.

2. The robot controller according to claim 1, wherein the processor prohibits a motion of the robot in a direction toward the welding target after the contact is detected by the contact detector.

3. An arc welding robot system comprising:
   a robot to which a welding torch is connected; and
   a robot controller according to claim 1, which controls the robot.

4. A robot controller that controls motion of a robot, to which a welding torch is connected, during a jog operation of the robot using a teaching operation device, the robot controller comprising:
   a contact detector that detects contact of a welding wire protruding from the welding torch with the welding target;
   an override-value adjuster that sets and changes an override value for increasing or decreasing an operating speed of the robot from a predetermined speed; and
   a processor that receives an operation signal from the teaching operation device and that controls the robot according to the operation signal at the operating speed based on the override value, the override value being set by the override-value adjuster,
   wherein the processor temporarily stops the robot and the override-value adjuster decreases the override value when the contact of the welding wire with the welding target is detected by the contact detector,
   wherein, after the contact is detected by the contact detector and when the welding wire is moved in a direction away from the welding target by a predetermined distance by a motion of the robot, the override-value adjuster increases the override value.

5. The robot controller according to claim 4, wherein the override-value adjuster increases the override value by an amount corresponding to a distance between the welding wire and the welding target.

6. The robot controller according to claim 4, wherein, when the override value is increased by the override-value adjuster, the processor performs a notification operation for making an operator recognize that the override value has been increased.

7. The robot controller according to claim 6, wherein the notification operation includes a temporary stop of the robot.

* * * * *